US012755253B2

(12) United States Patent
Teranishi et al.

(10) Patent No.: US 12,755,253 B2
(45) Date of Patent: Oct. 6, 2026

(54) MAINTENANCE SYSTEM AND MAINTENANCE METHOD

(71) Applicant: Hitachi Channel Solutions, Corp., Tokyo (JP)

(72) Inventors: Hiroki Teranishi, Tokyo (JP); Sho Mizuno, Tokyo (JP)

(73) Assignee: HITACHI CHANNEL SOLUTIONS, CORP., Tokyo (JP)

( * ) Notice: Subject to any disclaimer, the term of this patent is extended or adjusted under 35 U.S.C. 154(b) by 0 days.

(21) Appl. No.: 19/073,179

(22) Filed: Mar. 7, 2025

(65) Prior Publication Data

US 2025/0307785 A1 Oct. 2, 2025

(30) Foreign Application Priority Data

Mar. 26, 2024 (JP) ................................ 2024-050366

(51) Int. Cl.
*G06Q 10/20* (2023.01)

(52) U.S. Cl.
CPC .................................. *G06Q 10/20* (2013.01)

(58) Field of Classification Search
CPC ................................................. G06Q 10/20
See application file for complete search history.

(56) References Cited

U.S. PATENT DOCUMENTS 10,108,889 B1 * 10/2018 Zaehring .......... G06K 19/06037
10,685,537 B1 * 6/2020 Moore .................... H04L 67/02
11,281,703 B1 * 3/2022 Aitchison .............. G06V 30/10
11,405,504 B1 * 8/2022 Tripathy ............... H04L 9/3213
2008/0040268 A1 * 2/2008 Corn .................... G06Q 30/014
705/305
2020/0210268 A1 * 7/2020 Nuthi ................. G05B 23/0275

FOREIGN PATENT DOCUMENTS

JP 2003-99550 A 4/2003
JP 2021-174085 A 11/2021

OTHER PUBLICATIONS

Chu, Li-Chuan, Chen-Lin Lee, and Chang-Jer Wu. "Applying QR code technology to facilitate hospital medical equipment repair management." 2012 International Conference on Control Engineering and Communication Technology. IEEE, 2012. (Year: 2012).*

* cited by examiner

*Primary Examiner* — Scott M Tungate
(74) *Attorney, Agent, or Firm* — MATTINGLY & MALUR, PC

(57) ABSTRACT

A maintenance company has and manages a first computer and a second computer, and a manufacturer has and manages a third computer. A processor of the first computer receives operation information for a defect of the object to be maintained output from the object to be maintained and transmits the received operation information to the third computer of the manufacturer. A processor of the third computer stores the operation information in a memory, and the second computer transmits replacement request information for requesting a replacement for the object to be maintained to the third computer of the manufacturer based on a request received from the first computer. The processor of the third computer approves an application for the replacement for the object to be maintained, in which the defect has occurred, when the operation information stored in the memory matches the replacement request information received from the second computer.

7 Claims, 11 Drawing Sheets

F I G. 6

502

5021

| MAINTENANCE COMPANY NAME | APPLICATION DATE | DEFECT OCCURRENCE DATE | PRODUCT NUMBER | REPLACEMENT DEVICE NAME | RECOMMENDED REPLACEMENT DEVICE | WARRANTY PERIOD | STATUS (APPROVED/ REJECTED/ PENDING) | PROVIDED REPLACEMENT DEVICE NAME | REPLACEMENT DEVICE ORDER INFORMATION STATUS | REPLACEMENT SHIPPING DATE | REPLACEMENT SHIPPING DESTINATION | xxDEPARTMENT OF C COMPANY HIROSHIMA PREFECTURE xx |
|---|---|---|---|---|---|---|---|---|---|---|---|---|
| A COMPANY | 2019/3/21 | 2019/2/7 | 7512345 | RECEIPT UNIT | RECEIPT UNIT | 2019/8/28 | APPROVED | RECEIPT UNIT | TRANSMITTED | UNSHIPPED | xxDEPARTMENT OF A COMPANY TOKYO xx WARD ∘∘∘ | SHIPPING SLIP NUMBER |
| B COMPANY | 2019/3/22 | 2019/1/27 | 75113335 | CARD READING UNIT | CARD READING UNIT | 2019/3/30 | APPROVED | CARD READING UNIT | TRANSMITTED | 2019/4/15 | xxDEPARTMENT OF B COMPANY OSAKA PREFECTURE xx CITY ∘∘∘ | 6563240508 |
| C COMPANY | 2020/4/1 | 2019/12/31 | 7598765 | DEPOSIT AND WITHDRAWAL PORT | IDENTIFICATION UNIT | 2020/5/31 | PENDING | | UNTRANSMITTED | UNSHIPPED | xxDEPARTMENT OF C COMPANY HIROSHIMA PREFECTURE xx | UNREGISTERED |
| D COMPANY | 2020/4/2 | 2016/3/3 | 7399876 | CONTROL UNIT | CONTROL UNIT | 2015/12/30 | REJECTED | ~ | ~ | ~ | ~ | ~ |
| .... | .... | .... | .... | .... | .... | .... | .... | .... | .... | .... | .... | .... |

F I G. 7

602

6021

| MAINTENANCE COMPANY NAME | REPLACEMENT SHIPPING DESTINATION | PRODUCT NUMBER | DELIVERY DATE | WARRANTY PERIOD |
|---|---|---|---|---|
| A COMPANY | xxDEPARTMENT OF A COMPANY TOKYO xx WARD | 7512345 | 2018/8/28 | 2019/8/28 |
| | | 7512346 | 2018/8/28 | 2019/8/28 |
| | | 7512347 | 2018/8/30 | 2019/8/30 |
| | | : | : | : |

| MAINTENANCE COMPANY NAME | REPLACEMENT SHIPPING DESTINATION | PRODUCT NUMBER | DELIVERY DATE | WARRANTY PERIOD |
|---|---|---|---|---|
| C COMPANY | xxDEPARTMENT OF C COMPANY HIROSHIMA PREFECTURE xx | 7598765 | 2019/5/31 | 2020/5/31 |
| | | 7598766 | 2019/5/31 | 2020/5/31 |
| | | 7599223 | 2019/6/30 | 2020/6/30 |
| | | : | : | : |

| MAINTENANCE COMPANY NAME | REPLACEMENT SHIPPING DESTINATION | PRODUCT NUMBER | DELIVERY DATE | WARRANTY PERIOD |
|---|---|---|---|---|
| B COMPANY | REPLACEMENT SHIPPING DESTINATION xxDEPARTMENT OF B COMPANY OSAKA PREFECTURE xxCITY | 7511335 | 2018/3/30 | 2019/3/30 |
| | | 7511336 | 2018/4/1 | 2019/4/1 |
| | | 7511340 | 2018/4/3 | 2019/4/3 |
| | | : | : | : |

MAINTENANCE SYSTEM AND MAINTENANCE METHOD

CROSS-REFERENCE TO RELATED APPLICATION

The present application claims priority from Japanese application JP2024-050366, filed on Mar. 26, 2024, the content of which is hereby incorporated by reference into this application.

BACKGROUND OF THE INVENTION

1. Field of the Invention

The present technology relates to a maintenance system and a maintenance method for maintaining various devices and apparatuses including transaction devices.

2. Description of the Related Art

In the related art, there are various maintenance systems for maintaining various devices and apparatuses including transaction devices. JP 2003-99550 A discloses "a replacement component ordering system that instructs a maintenance worker to perform maintenance work based on an abnormal state reported from an apparatus and performs a process of delivering a replacement component to a predetermined location, the replacement component ordering system including: a component management means that receives replacement component information and transmits delivery instruction information for causing a delivery company to deliver the component on a designated date to the delivery company based on the replacement component information and component management information having a stock state of components; and an abnormality notification management means that receives the notification, determines whether or not a component related to an abnormality needs to be replaced based on the abnormal state, and transmits the replacement component information to the component management means based on the determination result".

Further, JP 2021-174085 A discloses that "when a failure occurs, a transaction device converts operation information including past failure history information into a two-dimensional barcode and displays the two-dimensional barcode, a terminal transmits the operation information generated by capturing the two-dimensional barcode to an information processing device, and the information processing device analyzes the failure history information to diagnose a defective location of the transaction device and recovery measures".

SUMMARY OF THE INVENTION

In JP 2003-99550 A, the maintenance work instruction is given to the maintenance worker based on the abnormal state reported from an image forming apparatus. When a component needs be replaced, in order to perform the process of delivering a replacement component to a predetermined location, the component to be replaced is automatically determined based on the abnormal state reported from the apparatus and is then ordered. In addition, in JP 2021-174085 A, a failure diagnosis is performed with reference to the past failure history before the failure prompted the dispatch of the maintenance worker to determine the true cause of the failure high accuracy. However, none of these techniques disclose the burden of collecting the object to be maintained, such as a device or apparatus to be replaced, in which a defect, such as a malfunction, a breakdown, or a failure, has occurred.

In this regard, when the object to be maintained is a consumable item, it may not be necessary to collect the object to be maintained from a maintenance site. However, the situation is different for the devices or apparatuses that are essential to continuing services and include units provided in a transaction device, such an automated teller machine (ATM), to deposit and withdraw banknotes and coins. It is necessary to collect the device or the apparatus, to specify the cause of the detect, and to provide a good product that operates normally as a replacement to the maintenance site. In this case, the maintenance company that is maintaining the object to be maintained performs a procedure of shipping the device or the apparatus, in which the defect has occurred, from the maintenance site to the manufacturer in order to replace the device or the apparatus and receives a replacement from the manufacturer. However, the procedures and costs borne by the maintenance company may be significant depending on the location of the maintenance site. For example, when the device or the apparatus in which the defect has occurred is located overseas, complicated procedures are required to export the device or the apparatus, resulting in significant costs. In addition, the lead time required for the maintenance company to receive a good product as the replacement, which may be an obstacle to continuously providing services in the maintenance site.

Accordingly, an object of the present invention is to provide a technique that can continuously provide services while reducing a burden of collecting an object to be maintained, such as a device or an apparatus, in which a defect has occurred.

According to an aspect of the present invention, there is provided a maintenance system for maintaining an object to be maintained between a maintenance company and a manufacturer using a computer having a processor and a memory. The maintenance company has a first computer and a second computer managed by the maintenance company, and the manufacturer has a third computer managed by the manufacturer. A processor of the first computer receives operation information for a defect of the object to be maintained outputted from the object to be maintained and transmits the received operation information to the third computer of the manufacturer. A processor of the third computer stores the operation information in the memory, and the second computer transmits replacement request information for requesting a replacement for the object to be maintained to the third computer of the manufacturer based on a request received from the first computer. The processor of the third computer approves an application for the replacement for the object to be maintained, in which the defect has occurred, when the operation information stored in the memory is matched with the replacement request information received from the second computer.

According to the present invention, it is possible to continuously provide services while reducing a burden of collecting an object to be maintained, such as a device or an apparatus, in which a defect has occurred.

BRIEF DESCRIPTION OF THE DRAWINGS

FIG. 6 is a view showing an example of application management information;

FIG. 7 is a view showing an example of delivered apparatus management information;

DETAILED DESCRIPTION OF THE PREFERRED EMBODIMENTS

Figure 1:
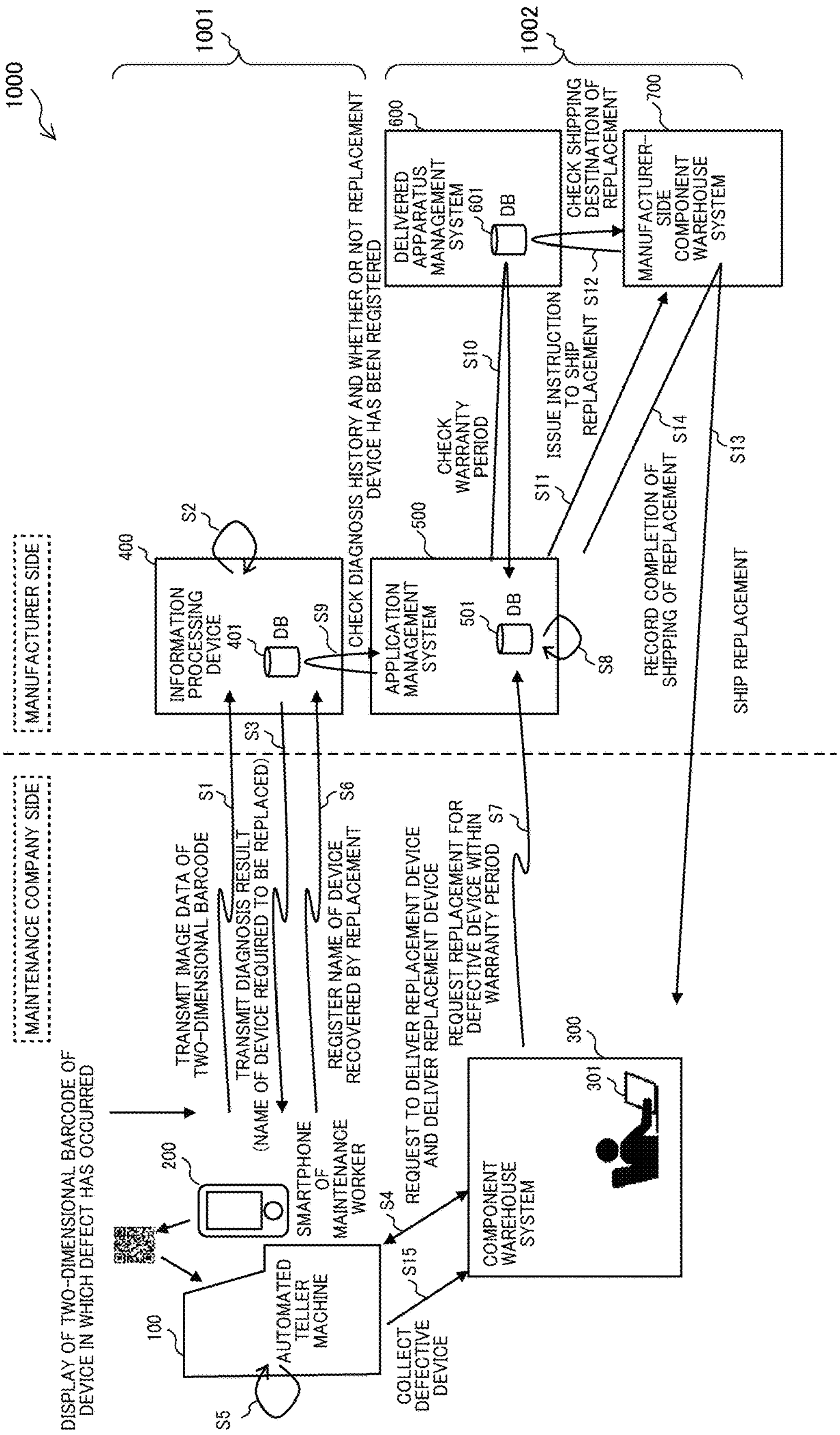
FIG. 1 is a view showing an example of a maintenance system according to an embodiment.

Hereinafter, an embodiment of the present invention will be described with reference to the drawings. The following description and drawings are examples for explaining the present invention, and some omissions and simplifications are made as appropriate for clarity of explanation. The present invention can be embodied in various other forms. Unless otherwise specified, each component may be singular or plural.

The position, size, shape, range, and the like of each component shown in the drawings may not indicate the actual position, size, shape, range, and the like of each component in order to facilitate understanding of the invention. Therefore, the present invention is not necessarily limited to the position, size, shape, range, and the like of each component disclosed in the drawings.

In the following description, various types of information are described using expressions such as a “database”, a “table”, and a “list”. However, the various types of information may be expressed using data structures other than these. An “XX table”, an “XX list”, and the like may be referred to as “XX information” in order to indicate that they are not dependent on the data structure. In the description of identification information, when expressions, such as “identification information”, an “identifier”, a “name”, an “ID”, and a “number”, are used, they are interchangeable.

When there are a plurality of components having the same or similar functions, different subscripts may be attached to the same reference numerals in the description of the plurality of components. However, when it is not necessary to distinguish between the plurality of components, the subscripts may be omitted in the description of the plurality of components.

In addition, in the following description, a process performed by executing a program may be described. However, the program is executed by a processor (for example, a central processing unit (CPU) or a graphics processing unit (GPU)) to perform a given process while appropriately using, for example, a storage resource (for example, a memory) and/or an interface device (for example, a communication port). Therefore, the subject of the process may be the processor. Similarly, the subject of the process performed by executing the program may be a controller, a device, a system, a computer, or a node having the processor. The subject of the process performed by executing the program may be a calculation unit and may include a dedicated circuit (for example, a field-programmable gate array (FPGA) or an application specific integrated circuit (ASIC)) that performs a specific process.

The program may be installed in a device, such as a computer, from a program source. For example, the program source may be a program distribution server or a computer-readable storage medium. When the program source is the program distribution server, the program distribution server may include a processor and a storage resource that stores the program to be distributed, and the processor of the program distribution server may distribute, to other computers, the program to be distributed. Furthermore, in the following description, two or more programs may be implemented as one program, or one program may be implemented as two or more programs.

Furthermore, in the following description, a case where the device, the apparatus, the terminal, or the system constituting this system is implemented by a single computer is given as an example. All or some of the functions thereof may be dispersively provided in one or more computers, such as clouds, and the computers may communicate with each other via a network to implement similar functions.

Embodiment 1

FIG. 1 is a view showing an example of a maintenance system 1000 according to this embodiment. The maintenance system 1000 is a system for maintaining an object to be maintained such as a device or an apparatus in which a defect, such as a malfunction, a breakdown, or a failure, has occurred. Hereinafter, a device will be described as an example of the object to be maintained. However, the present invention can be applied to various objects to be maintained such as apparatuses and units. That is, in the following description, the device can be substituted with an apparatus, a unit, or the like.

The maintenance system 1000 includes a diagnostic system 1001 for diagnosing the device in which a defect, such as a malfunction, a breakdown, or a failure, has occurred and a replacement request system 1002 for requesting a good product that operates normally as a replacement for the device in which the defect has occurred. Hereinafter, a case where a device of an automated teller machine (ATM) is the object to be maintained will be described. The object to be maintained may include not only the above-described device but also an ATM 100.

As shown in FIG. 1, the diagnostic system 1001 includes the ATM 100 that is installed at a maintenance site managed by a maintenance company, a mobile terminal 200 of a maintenance worker who performs maintenance work on the ATM 100, and an information processing device 400 that is owned by a manufacturer which manufactures and repairs the device of the ATM 100 and supplies replacements to the maintenance company and that diagnoses the device in which a defect, such as malfunction, a breakdown, or a failure, has occurred. The replacement request system 1002 includes a component warehouse system 300 that manages the stock of the devices stored in a component warehouse of the maintenance company and applies for a replacement request for the device in which a defect, such as a malfunction, a breakdown, or a failure, has occurred, an application management system 500 that processes the application for the replacement request, checks a warranty period for the device in which a defect, such as a malfunction, a breakdown, or a failure, has occurred, and issues an instruction to ship a good product that operates normally as the replacement, a delivered apparatus management system 600 that checks the warranty period of the device in which a defect, such as a malfunction, a breakdown, or a failure, has occurred, in response to the request from the application management system 500, and a manufacturer-side component warehouse system 700 that checks the stock and shipping destination of the replacement and ships the replacement.

The ATM 100 and the mobile terminal 200 may be included in the replacement request system 1002. In addition, the component warehouse system 300 may be included in the diagnostic system 1001. It is assumed that an environment is established in which the maintenance company and the manufacturer can communicate with each other via a general information and communication network that is known in the related art, and the systems, the apparatuses, and the devices owned by each of the maintenance company and the manufacturer can communicate with each other via their own internal networks. First, the ATM 100 will be described.

The ATM 100 is a device for carrying out various transactions with users, such as depositing and withdrawing banknotes and coins and recording transactions in bankbooks.

Figure 2A:
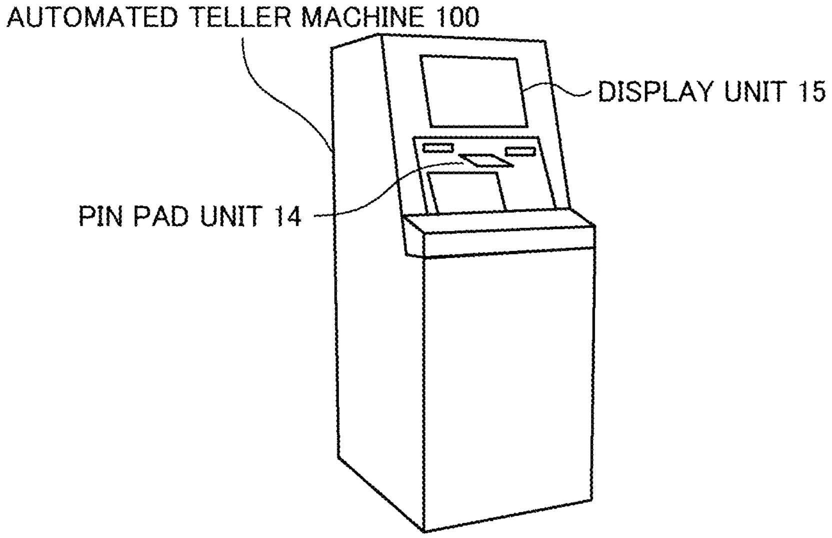
FIG. 2A is a view showing an example of an ATM.
Figure 2B:
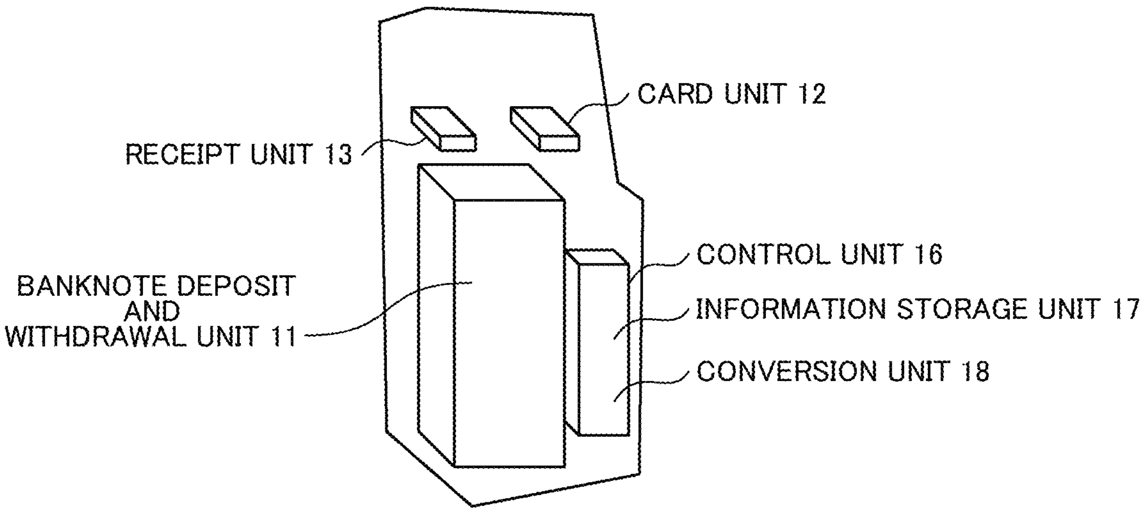
FIG. 2B is a view showing an example of the ATM.

FIGS. 2A and 2B are views showing an example of the ATM 100. As shown in FIGS. 2A and 2B, the ATM 100 includes, as main configurations, a banknote deposit and withdrawal unit 11, a card unit 12, a receipt unit 13, a PIN pad unit 14, a display unit 15, and a control unit 16.

The banknote deposit and withdrawal unit 11 is composed of a device having a banknote transport function and a banknote identification function and deposits and withdraws banknotes. The card unit 12 is composed of a device having a card transport function and a function of reading and writing a magnetic stripe and an IC chip and performs a card reading process for carrying out transactions. The receipt unit 13 is composed of a device having a function of printing the content of a transaction on a receipt and a function of transporting the receipt and performs a process of issuing the receipt.

The PIN pad unit 14 is composed of a device that includes number keys from 0 to 9 and has a function of receiving a personal identification number and an amount input by a user at the time of a transaction. The display unit 15 is composed of a device having a display that displays a guidance screen for a transaction operation when the user of the ATM 100 performs a transaction and the result of the user's input such as a PIN number. Further, when a failure occurs in the ATM 100, the display unit 15 displays a two-dimensional barcode (for example, a QR code (registered trademark)) including operation information of the ATM 100 or the device of the ATM 100, in response to an operation of a maintenance worker. An example of the operation information will be described below.

The control unit 16 is composed of a control unit having hardware, such as a CPU and a memory (not shown), functionally has an information storage unit 17 and a conversion unit 18, and has a function of controlling each unit of the ATM 100. The information storage unit 17 stores operation information including the results of the transactions between the ATM 100 and the users and detailed log information when a defect, such as a malfunction, a breakdown, or a failure has occurred. Each device of the ATM 100 records the operation of the device in the operation information in real time. When an instruction to display a two-dimensional barcode is issued by the maintenance worker, the conversion unit 18 converts the operation information stored in the information storage unit 17 into a two-dimensional barcode and displays the two-dimensional barcode on a screen of the display unit 15. A case where the conversion unit 18 converts the operation information into a two-dimensional barcode will be described below as an example. However, the operation information may be expressed as code information symbolized in a predetermined dimension.

The two-dimensional barcode includes operation information, such as a product number for identifying the device of the ATM 100, the date and time when a defect, such as a malfunction, a breakdown, or a failure, occurred, an error code for identifying the defect, and the state of the device when the error code is output. Further, the two-dimensional barcode includes, for example, URL information for transmitting the operation information to the information processing device 400. The error code includes identification information indicating the state when an abnormality has occurred in the ATM 100, such as a location where a banknote transport operation has stopped in the banknote deposit and withdrawal unit 11 of the ATM 100. Next, the mobile terminal 200 will be described.

The mobile terminal 200 is a terminal operated by the maintenance worker, and a general mobile terminal (for example, a smartphone or a tablet terminal) having a touch panel and a camera can be used as the mobile terminal 200. Since the mobile terminal 200 has a configuration that is known in the related art, a description of the configuration will be omitted here. Next, the component warehouse system 300 will be described.

Figure 3:
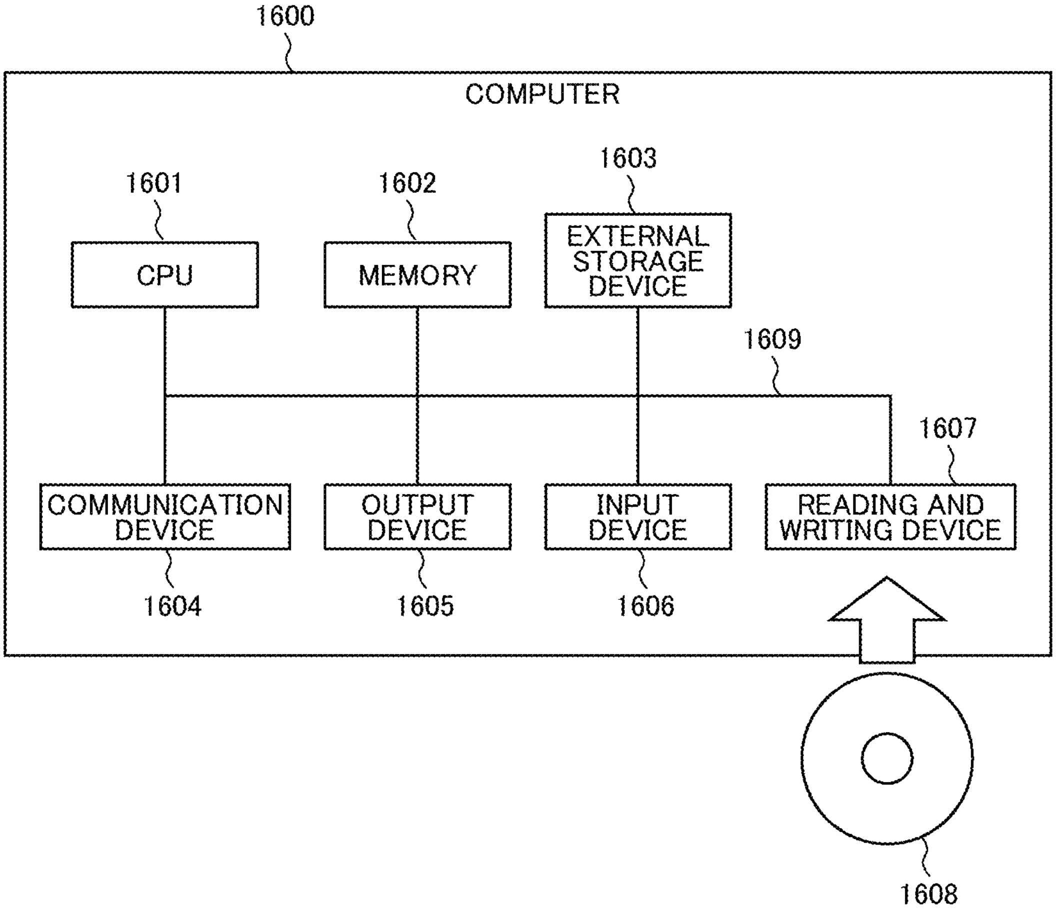
FIG. 3 is a diagram showing an outline of a computer.

The component warehouse system 300 is a system that manages the stock of the devices stored in the component warehouse of the maintenance company and manages an application for a replacement request and receipt of replacements. The functions of the component warehouse system 300 are implemented by a computer operated by an administrator of the component warehouse. The computer can be implemented, for example, by a general computer 1600 including a CPU 1601, a memory 1602, an external storage device 1603, such as a hard disk drive (HDD), a reading and writing device 1607 that reads and writes information from and to a portable storage medium 1608, such as a compact disk (CD) or a USB memory, an input device 1606, such as a keyboard, a mouse, a reader, or a scanner, that receives the input of various types of information, an output device 1605, such as a display, that outputs various types of information which have been input and are used for processes, a communication device 1604, such as a network interface card (NIC), for connection to a communication network, and an internal communication line (called a system bus) 1609, such as a system bus, that connects these components, as shown in FIG. 3 (schematic diagram showing the computer).

Moreover, various types of data that are stored in the component warehouse system 300 or that are used for processes can be implemented by the CPU 1601 reading out the data from the memory 1602 or the external storage device 1603 and using the read-out data. In addition, the CPU 1601 can load a predetermined program stored in the external storage device 1603 into the memory 1602 and execute the program to implement each function of the component warehouse system 300.

The predetermined program and data may be stored (downloaded) in the external storage device 1603 from the storage medium 1608 via the reading and writing device 1607 or from the network via the communication device 1604, may be loaded onto the memory 1602, and may be executed by the CPU 1601. In addition, the program and data may be directly loaded onto the memory 1602 from the storage medium 1608 via the reading and writing device 1607 or from the network via the communication device 1604 and may be executed by the CPU 1601. Next, the component warehouse system 300 will be described.

The component warehouse system 300 outputs a replacement request screen for requesting a replacement for the device, in which a defect, such as a malfunction, a breakdown, or a failure, has occurred, to a display device such as a display of the computer. The administrator operates the screen to request the replacement for the device in which a defect, such as a malfunction, a breakdown, or a failure, has occurred.

Figure 4:
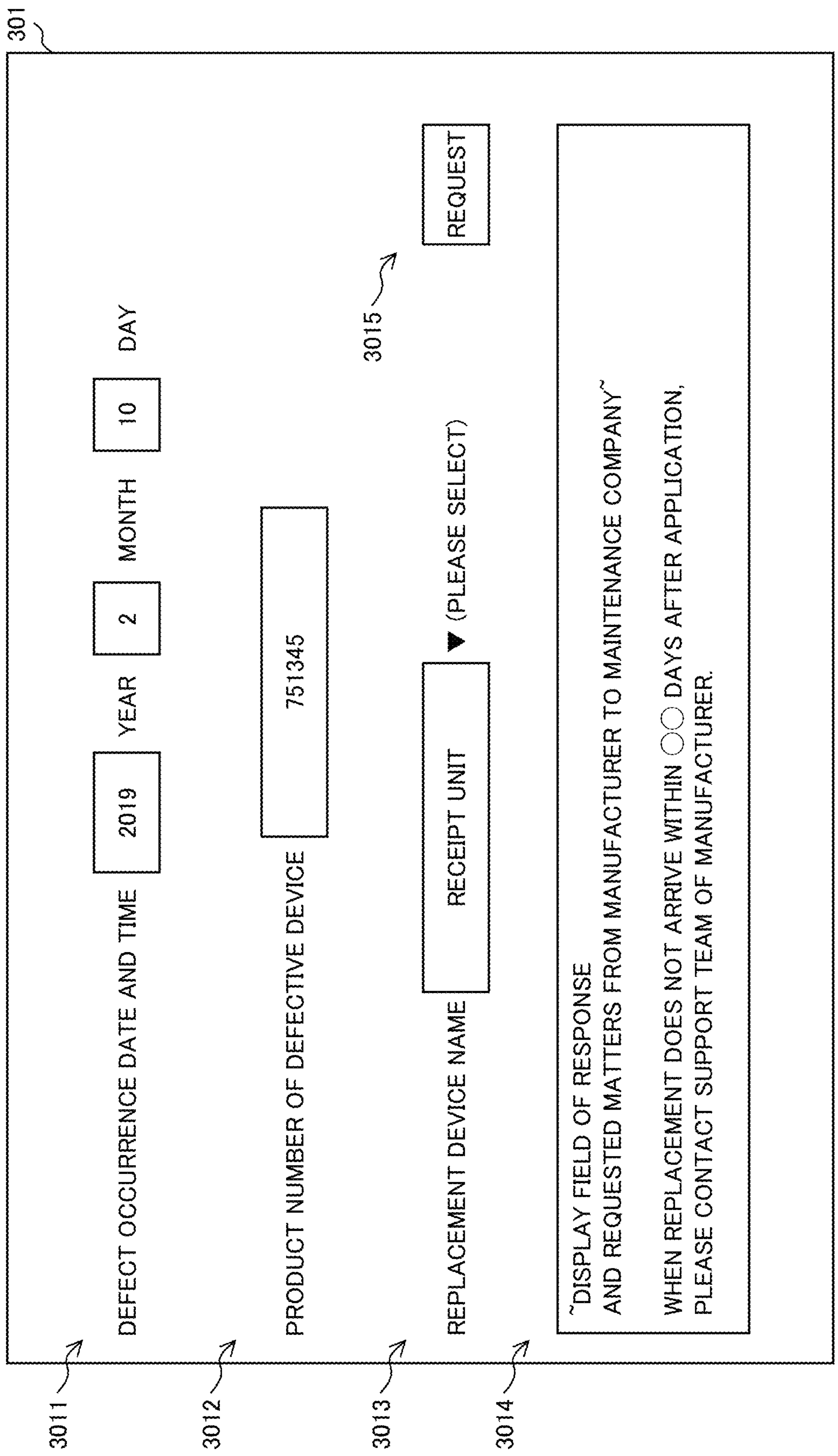
FIG. 4 is a view showing an example of a replacement request screen.

FIG. 4 is a view showing an example of the replacement request screen. As shown in FIG. 4, a replacement request screen 301 includes a defect occurrence date 3011 for inputting the occurrence date of a defect, such as a malfunction, a breakdown, or a failure, a product number 3012 for inputting the product number of the device in which the defect has occurred, a replacement device name 3013 for designating a replacement for the device in which the defect has occurred, a display field 3014 for displaying information to be transmitted from the manufacturer to the maintenance company, and a request button 3015 for applying to the application management system 500 for a replacement request.

FIG. 4 shows that the administrator of the component warehouse system 300 requests a replacement for the receipt unit (product number: 7512345) in which a defect, such as a malfunction, a breakdown, or a failure, occurred on Feb. 10, 2019 on the replacement request screen 301. In addition, a method for responding to a case where the replacement has not arrived is displayed as a message predetermined by the application management system 500 in the display field 3014. The administrator of the component warehouse system 300 inputs replacement request information including at least the defect occurrence date 3011, the product number 3012, and the replacement device name 3013 on the replacement request screen 301. When the component warehouse system 300 receives the pressing of the request button 3015, it transmits the input replacement request information to the application management system 500. As described above, the administrator of the component warehouse system 300 requests a replacement for the device, in which the defect has occurred and which has been notified by the maintenance worker, through the replacement request screen 301. In addition, in FIG. 4, the description has been made on the assumption that the date on which the defect occurred is input. However, in practice, the time when the defect occurred is also input. That is, it is assumed that the date and time when the defect occurred is input on the replacement request screen 301. Next, the information processing device 400 will be described.

The information processing device 400 is a device for diagnosing the device in which the defect has occurred. The device can be the general computer shown in FIG. 3. As shown in FIG. 1, the information processing device 400 has a database 401. The database 401 stores learning data in which the operation information of the device, in which a defect, such as a malfunction, a breakdown, or a failure, has occurred, recovery measures for the device, and the content of measures proposed for the device by a diagnostic system, which will be described below, have been associated with each other.

Figure 5:
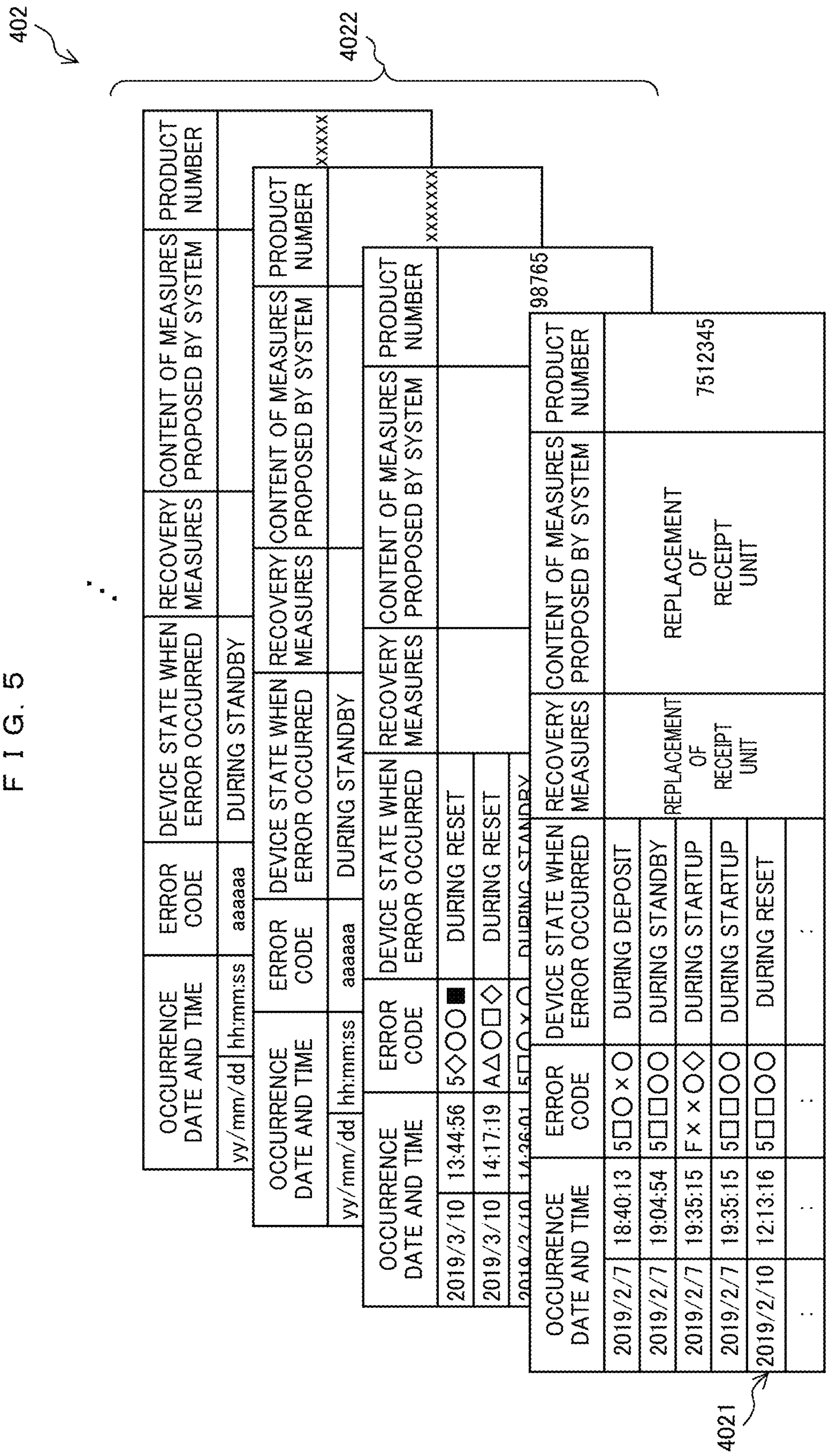
FIG. 5 is a view showing an example of learning data.

FIG. 5 is a view showing an example of the learning data. As shown in FIG. 5, in learning data 402, an occurrence date and time indicating the date and time when a defect, such as a malfunction, a breakdown, or a failure, occurred, an error code, the state of the device when an error occurred, the product number of the device, the content of the measures for the device in which the defect diagnosed by the diagnostic system has occurred, and the recovery measures actually taken by the maintenance worker are stored in association with each other. The occurrence date and time, the error code, the state of the device when the error occurred, and the product number of the device are information that can be obtained from the operation information.

FIG. 5 shows, for example, a record 4021 indicating that an error occurred in the receipt unit which was being reset and was identified by a product number "7512345" at 12:13:16 on Feb. 10, 2019 and an error code "5□□○○" indicating the error was output. In addition, the record 4021 indicates that the diagnostic system diagnosed the error and proposed the measures whose content is "replacement of the receipt unit" and the maintenance worker actually replaced the receipt unit to perform the recovery measures in response to the proposal.

The content of the measures is information indicating the diagnosis results of the diagnostic system based on the past records 4022 included in the learning data 402. Various systems known in the related art can be used as the diagnostic system, which will not be specifically described in this embodiment. The diagnostic system selects the most appropriate measures (for example, the replacement of the device) as the measures for the device, in which a defect, such as a malfunction, a breakdown, or failure, occurred in the past, with reference to, for example, the past records 4022 stored as the learning data 402 and records the selected measures in the content of the measures in the record 4021. The most appropriate measures are, for example, measures that appear most frequently in the content of the measures corresponding to the same past error code as the current error code stored in the record 4021. The diagnostic system may be included in the information processing device 200.

Alternatively, the diagnostic system may be included in a device or a system other than the information processing device 200, and the information processing device 200 may access the device or the system to receive the diagnosis results. Next, the application management system 500 will be described.

The application management system 500 is a system for processing the application for the replacement request that includes the check of the warranty period and an instruction to ship the replacement and has been received from the component warehouse system 300. The functions of the application management system 500 are implemented by the general computer shown in FIG. 3. The computer is operated by an administrator of the application management system 500. As shown in FIG. 1, the application management system 500 has a database 501. The database 501 stores application management information in which the replacement request information applied for by the maintenance company, information related to the warranty period of the device for which the replacement request information has been transmitted, a status indicating a processing state of the application management system 500 for the replacement request, information related to the replacement or the shipping of the replacement, and a recommended replacement device indicating a replacement recommended by the diagnostic system have been associated with each other.

FIG. 6 is a view showing an example of the application management information 502. The application management information 502 is information related to the application for the replacement request received from the maintenance company. As shown in FIG. 6, the following are stored in the application management information 502 so as to be associated with each other: a maintenance company name for identifying the maintenance company; an application date indicating the date on which the maintenance company applied for the replacement request; a defect occurrence date indicating the date on which a defect, such as a malfunction, a breakdown, or a failure, occurred in the device; a product number of the device; a replacement device name which is a device requested as a replacement for the device; a recommended replacement device which is a device diagnosed by the diagnostic system as being recommended for replacement; a warranty period of the device in which a defect, such as a malfunction, a breakdown, or a failure has occurred; a status indicating the processing state of the manufacturer for the application for the replacement request; a provided replacement device name indicating a replacement actually provided by the manufacturer; a replacement device order information status indicating whether or not replacement device order information has been transmitted; a replacement shipping date indicating the date on which the replacement was actually shipped; a replacement shipping destination indicating a shipping destination of the replacement; and a shipping slip number issued by a shipper when the replacement was shipped.

FIG. 6 shows, for example, a record 5021 indicating that a maintenance company "A company" applied for a replacement request for a device "receipt unit", which was identified by a product number "7512345" and in which a defect occurred on Feb. 7, 2019, on Mar. 21, 2019 within the warranty period ending on Aug. 28, 2019 and the manufacturer approved the application. In addition, the record 5021 indicates that the diagnostic system presented a "receipt unit" as the recommended replacement device as the result of the diagnosis. Further, the record 5021 indicates a state in which the manufacturer has already transmitted information for the replacement for the approved "receipt unit" to the manufacturer-side component warehouse system 700, but the replacement has not yet been shipped from the manufacturer-side component warehouse system 700 to the maintenance company "A company".

The maintenance company name and the application date are written by the application management system 500 at the timing when the application management system 500 receives the application for the replacement request from the component warehouse system 300. In addition, for the defect occurrence date, the product number, and the replacement device name, the information input on the replacement request screen 301 shown in FIG. 4 is written by the application management system 500. Further, for the recommended replacement device name, the device recommended for replacement by the diagnostic system is written by the application management system 500. For the warranty period, the warranty period of the device inquired about by the delivered apparatus management system 600 is written by the application management system 500. Furthermore, for the status, any one of "approved", "pending", and "rejected" is written by the administrator of the application management system 500 or by the application management system 500. For the provided replacement device name, the replacement device order information status, the replacement shipping date, the replacement shipping destination, and the shipping slip number, after inquiring information of these items from the manufacturer-side component warehouse system 700, the application management system 500 writes these items. Next, the delivered apparatus management system 600 will be described.

The delivered apparatus management system 600 is a system for managing the warranty period of the device delivered by the manufacturer to the maintenance company. The delivered apparatus management system 600 can be implemented, for example, by the general computer shown in FIG. 3. As shown in FIG. 1, the delivered apparatus management system 600 includes a database 601. The database 601 stores delivered apparatus management information in which the delivery destination of the device of the ATM 100, the shipping destination of the replacement, and information related to the delivered device have been associated with each other.

FIG. 7 is a view showing an example of the delivered apparatus management information. The following are stored in delivered apparatus management information 602 in association with each other: a maintenance company name which is the name of the maintenance company which is a delivery destination of the device of the ATM 100; a replacement shipping destination which is a shipping destination of the replacement shipped from the manufacturer; a product number of the delivered device; a delivery date of the device; and a warranty period of the device.

FIG. 7 shows, for example, a record 6021 indicating that, for the maintenance company "A company", an address "xx ward, Tokyo" of the company's responsible department "XX department of the A company" is registered as the replacement shipping destination. A department name of the maintenance company, contact information, such as an email address and a telephone number, and a name of a person in charge are stored in the replacement shipping destination. In addition, the manufacturer delivered devices of the ATM 100 identified by product numbers "7512345" and "7512346" to the maintenance company "A company" on Aug. 28, 2018, and the warranty periods of these devices were registered as Aug. 28, 2019 that is one year after the delivery date. Similarly, the record indicates that the device of the ATM 100 identified by a product number "7512347" was delivered on Aug. 30, 2018 and the warranty period of the device was registered as Aug. 30, 2019 that is one year after the delivery date. It is assumed that each item of the delivered apparatus management information is registered in advance at the timing when the manufacturer delivers the device of the ATM 100 to the maintenance company. Next, the manufacturer-side component warehouse system 700 will be described.

The manufacturer-side component warehouse system 700 is a system for managing the stock and shipping destination of the replacement shipped by the manufacturer. The manufacturer-side component warehouse system 700 can be implemented, for example, by the general computer shown in FIG. 3. The manufacturer-side component warehouse system 700 is a system for shipping the replacement in stock to the maintenance company applied for the replacement request in response to an instruction from the application management system 500. Data held by the manufacturer-side component warehouse system 700 is not given as an example. For example, it is assumed that the manufacturer-side component warehouse system 700 has a database storing information related to shipping, such as a slip number written on a slip for shipping a replacement from a carrier, a product number of the replacement to be shipped, a shipping destination, and a shipping source and can provide the information to the application management system 500 in response to an instruction from the application management system 500.

The configuration of the maintenance system 1000 shown in FIG. 1 has been described above, and specific processes performed by each system, each terminal, and each device will be described below with reference to flowcharts. Next, returning to FIG. 1, an outline of the process performed by the maintenance system 1000 will be described.

As shown in FIG. 1, first, when the maintenance worker of the maintenance company receives a communication indicating that a defect, such as a malfunction, a breakdown, or a failure, has occurred from a person in charge in a maintenance site, the maintenance worker rushes to the maintenance site and instructs the conversion unit 18 of the ATM 100, in which a defect, such as a malfunction, a breakdown, or a failure, has occurred, to output operation information. The conversion unit 18 converts the operation information into a two-dimensional barcode and displays the two-dimensional barcode on the screen of the display unit 15 in response to the instruction. The maintenance worker takes an image of the two-dimensional barcode displayed on the screen with the mobile terminal 200 and transmits data of the image to a URL which is a predetermined address of the information processing device 400 (S1).

The information processing device 400 reads out the operation information included in the two-dimensional barcode received from the mobile terminal 200 of the maintenance worker and registers the read-out operation information in the database 501 shown in FIG. 5. As a result of the registration, a new record (the record 4021 in FIG. 5), in which an "occurrence date and time", an "error code", a "device state when the error occurred", and a "product number" have been recorded, is registered in the database 401. In addition, when the information processing device 400 performs the registration, the diagnostic system specifies a record group including the registered "error code", "device state when the error occurred", and "product number" from the past records 4022 included in the learning data 402 and outputs the content of measures that appears most frequently among the "contents of the measures proposed by the system" in the specified record group. The information processing device 400 records the content of the measures output from the diagnostic system in the "content of measures proposed by the system" in the new record (S2). Furthermore, the information processing device 400 transmits the diagnosis results including the content of the measures to the mobile terminal 200 (S3).

The maintenance worker operates the mobile terminal 200 to read out the diagnosis results received from the information processing device 400, specifies measures (for example, replacement) for the device of the ATM 100, in which a defect, such as a malfunction, a breakdown, or a failure, has occurred, requests the component warehouse system 300 to deliver the device required for the measures using a communication means such as email (S4), and recovers the ATM 100 using the delivered device or apparatus (S5). When the recovery work is normally performed, the maintenance worker operates the mobile terminal 200 to register the recovered device of the ATM 100 in the mobile terminal 200 and the database 401 of the information processing device 400 (S6). As a result of the registration, the item "recovery measures" of the new record in the database 401 shown in FIG. 5 is registered. When the process in S6 is ended, the process of the diagnostic system 1001 is ended.

Then, in S4, in order to replenish the stock of the device whose delivery has been requested by the maintenance worker, the component warehouse system 300 transmits replacement request information including the defect occurrence date 3011, the product number 3012, and the replacement device name 3013 from the replacement request screen 301 shown in FIG. 4 to the manufacturer to apply for the replacement request (S7). When receiving the replacement request information from the component warehouse system 300, the application management system 500 registers, as a new record (for example, the record 5021) of the database 501, the defect occurrence date 3011, the product number 3012, and the replacement device name 3013 included in the replacement request information together with the "application date" which is the date on which the replacement request was applied for and the "maintenance company" (S8). For example, the maintenance company name may be stored in advance in the component warehouse system 300 in association with the component warehouse system 300. At the time of the application for the replacement request, the maintenance company name may be transmitted to the application management system 500 together with the replacement request information, and the application management system 500 may register both the maintenance company name and the replacement request information as the new record.

Further, the application management system 500 checks that a record including the same information as the replacement request information (the same information as the defect occurrence date 3011, the product number 3012, and the replacement device name 3013) has been registered in the database 501 of the information processing device 400 (S9). When the application management system 500 checks that the same information has been registered, it further accesses the delivered apparatus management system 600 to check the warranty period associated with the same product number as the product number included in the same information as the replacement request information for the maintenance company applied for the replacement request (S10). When the result of the check shows that the device is within the warranty period, the application management system 500 instructs the manufacturer-side component warehouse system 700 to ship a replacement for the device with the product number to the maintenance company (S11).

When receiving the instruction to ship the replacement from the application management system 500, the manufacturer-side component warehouse system 700 accesses the delivered apparatus management system 600 using the maintenance company and the product number, searches the database 601 for a record including the information, and checks the replacement shipping destination (S12). When checking the replacement shipping destination, the manufacturer-side component warehouse system 700 issues a shipping instruction to the carrier in order to ship the replacement to the shipping destination, and the carrier ships the replacement (S13). When receiving a shipping slip number from the carrier as information indicating that the replacement has been shipped, the manufacturer-side component warehouse system 700 transmits, to the application management system 500, shipping completion information including the slip number, the replacement shipping date, and the replacement shipping destination, and the application management system 500 records the information in the new record of the database 501 (S14).

The maintenance company replenishes the component warehouse with the replacement received from the manufacturer in S13 as the stock of the device for which the replacement request has been applied and collects the device of the ATM 100 in which a defect, such as a malfunction, a breakdown, or a failure, has occurred (S14).

Next, a detailed process of the outline of the process performed by the system shown in FIG. 1 will be described.

First, a process of repairing a defect, such as a malfunction, a breakdown, or a failure, that has occurred in the ATM 100 will be described.

Figure 8:
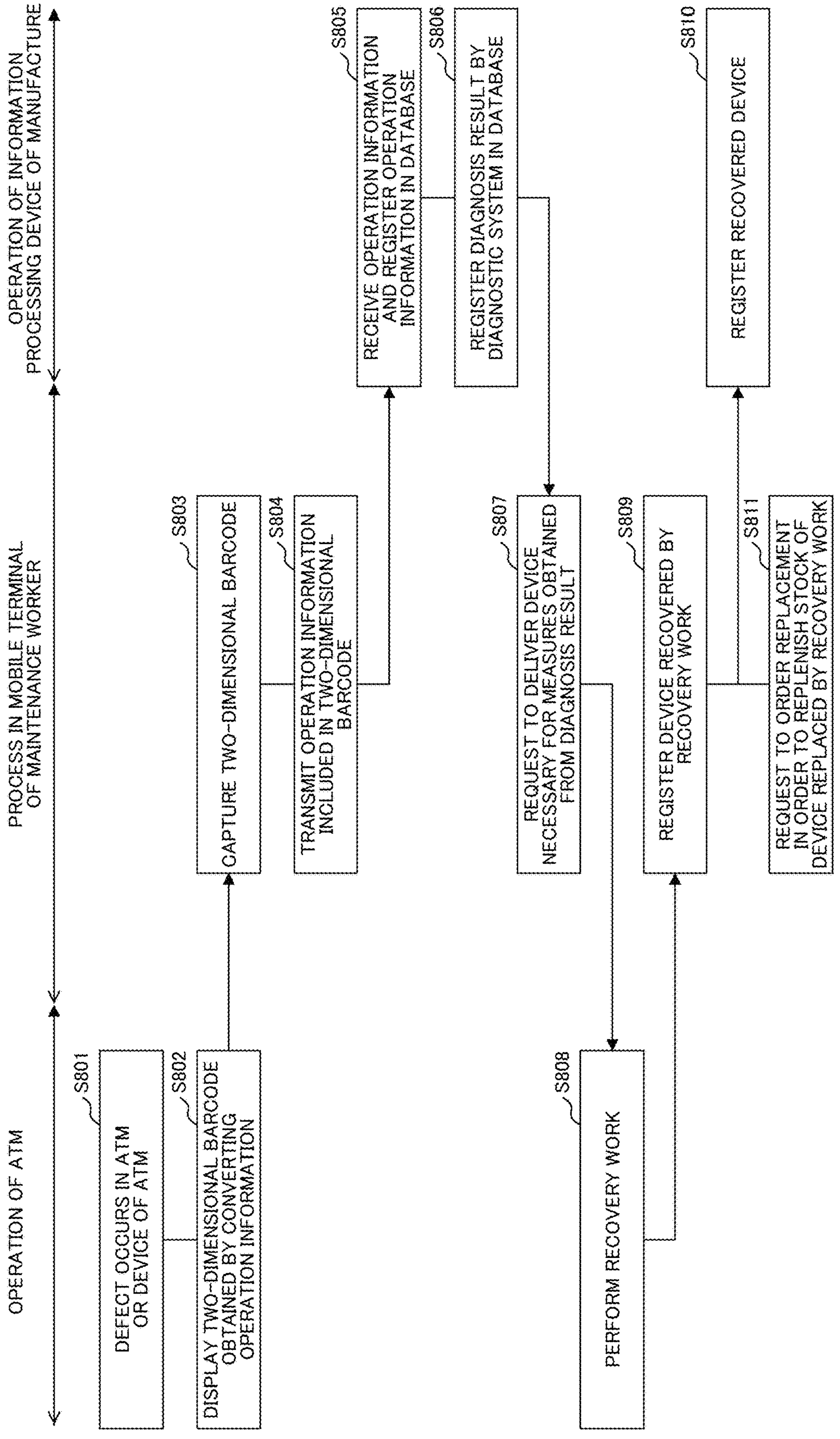
FIG. 8 is a flowchart showing an example of a procedure of a recovery process for recovering a device in which a defect, such as a malfunction, a breakdown, or a failure, has occurred.

FIG. 8 is a flowchart showing an example of a procedure of a recovery process of recovering the device in which a defect, such as a malfunction, a breakdown, or a failure, has occurred. As shown in FIG. 8, in the recovery process, first, when a defect, such as a malfunction, a breakdown, or a failure, occurs in the device of the ATM 100 (S801), the ATM 100 displays, on the display unit 15, a two-dimensional barcode including the operation information (each of information items of the "occurrence date and time", the "error code", the "device status when the error occurred", and the "product number") generated by the conversion unit 18 for the defective device (S802).

The maintenance worker operates the mobile terminal 200 to take an image of the two-dimensional barcode including the operation information displayed on the display unit 15 (S803), and the mobile terminal 200 transmits the two-dimensional barcode to the information processing device 400 (S804).

The information processing device 400 registers the operation information included in the two-dimensional barcode received from the mobile terminal 200 in the database 401 (S805). The information processing device 400 instructs the diagnostic system to analyze the operation information and to propose measures for the device in which a defect, such as a malfunction, a breakdown, or a failure has occurred. The information processing device 400 records the result of the analysis performed in response to the instruction as the diagnosis result in the "content of measures proposed by the system" of the database 401 and transmits the diagnosis result to the mobile terminal 200 (S806).

The maintenance worker operates the mobile terminal 200 to read out the "content of measures proposed by the system" from the diagnosis result received from the information processing device 400 and checks the measures for the defect that has occurred in S801. Then, the mobile terminal 200 receives an instruction from the maintenance worker and requests the component warehouse system 300 to deliver the device to be replaced, which is recorded as the "content of measures proposed by the system", using a communication means such as e-mail (S807).

The maintenance worker incorporates the device delivered by the component warehouse system 300 to recover the ATM 100 in which a defect, such as a malfunction, a breakdown, or a failure, has occurred (S808). The recovery of the ATM 100 at the timing of S808 makes it possible to quickly resume and continue the services provided by the ATM 100 without waiting for the arrival of the replacement shipped from the manufacturer.

The maintenance worker operates the mobile terminal 200 to register the recovered device in the mobile terminal 200 (S809) and then requests registration in the database 401 of the application management system 500 using a communication means, such as email, and the information processing device 400 registers the recovered device of the ATM 100 in the "recovery measures" of the database 401 based on the request (S810).

Furthermore, in response to the operation of the maintenance worker, the mobile terminal 200 requests the component warehouse system 300 to transmit an order for a replacement for the device to the manufacturer, using a communication means, such as email, in order to replenish the stock of the device used for the recovery in S808 (S811). When the process in S811 is ended, the recovery process shown in FIG. 8 is ended. Next, a replacement request process from an application for a replacement request to the shipping of the replacement to the maintenance company will be described.

Figure 9:
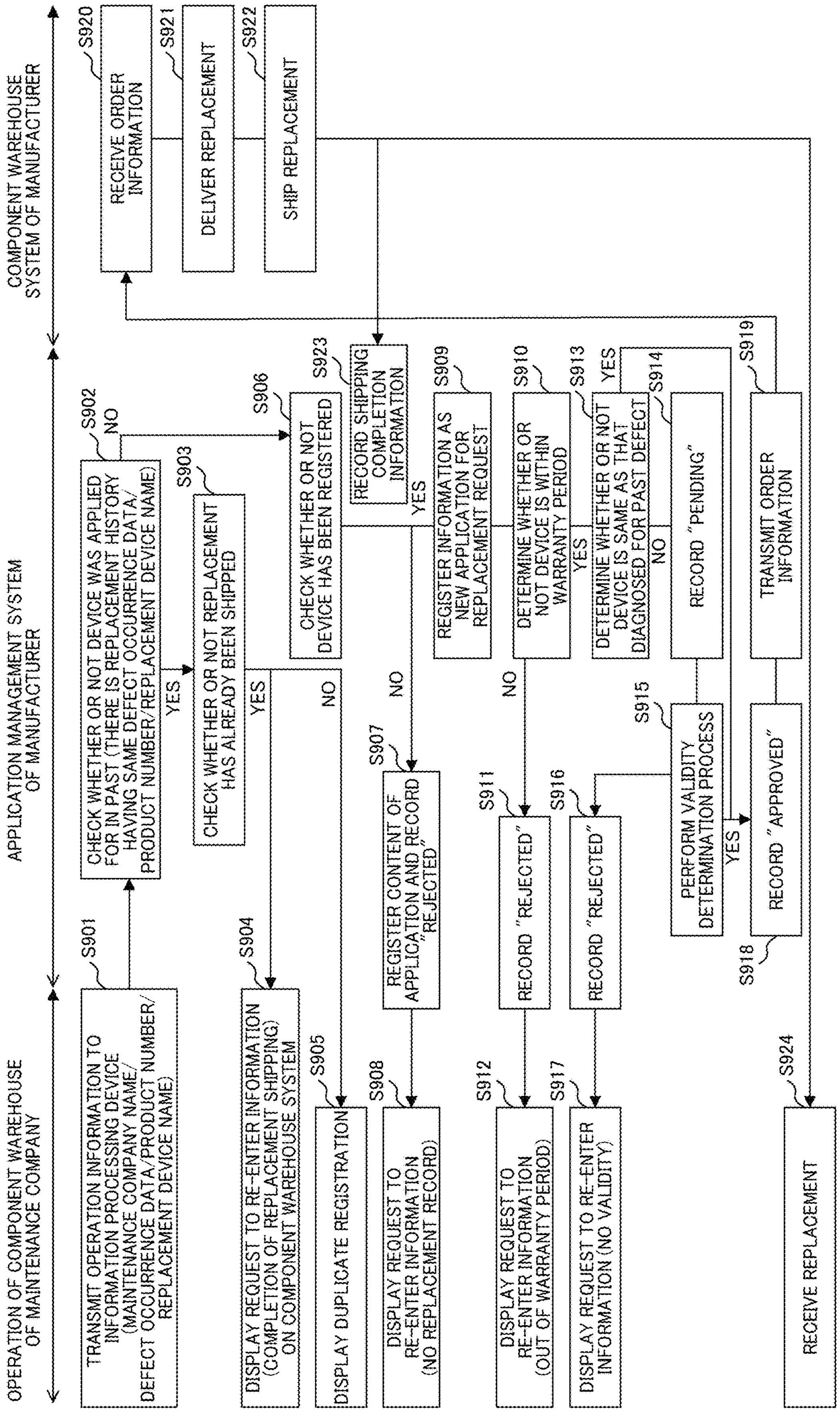
FIG. 9 is a flowchart showing an example of a procedure of a replacement request process.

FIG. 9 is a flowchart showing an example of a procedure of the replacement request process. As shown in FIG. 9, first, the component warehouse system 300 applies for the replacement request made by the mobile terminal 200 (S901). The application is performed from the screen 301 shown in FIG. 4.

The application management system 500 receives the application for the replacement request from the component warehouse system 300, determines whether or not the same maintenance company applied for the replacement request for the device with the same product number in the past, and checks the determination result (S902). For example, the application management system 500 refers to the database 501, determines that this is a duplicate request when the product number, the replacement device name, and the defect occurrence date included in the application for the replacement request are the same as those in the current application for the replacement request made by the same maintenance company, and determines that the application for the replacement request has already been made for the device.

When the application management system 500 determines that the application for the replacement request has already been made for the device (S902; YES), it further refers to the database 501 to determine whether or not the replacement has already been shipped and checks the determination result (S903). For the determination of whether or not the replacement has been shipped, for example, when a date is stored in the "replacement shipping date", the application management system 500 may determine that the replacement has been shipped.

When the application management system 500 determines that the replacement has already been shipped (S903; YES), it notifies the component warehouse system 300 of the fact, and the component warehouse system 300 displays a replacement shipping completion screen, which indicates that the replacement for the device applied for in S901 has already been shipped and prompts the user to re-enter each information item in the application for the replacement request, on the display device of the computer (S904).

On the other hand, when the application management system 500 determines that the replacement has not already been shipped (S903; NO), it notifies the component warehouse system 300 that, since the application for the replacement request has already been received, it will not be approved due to duplicate registration, and the component warehouse system 300 displays the fact on the screen of the display device of the computer (S905).

When the application management system 500 determines in S902 that the application for the replacement request has not already been made for the device (S902; NO), it further refers to the database 401 of the information processing device 400 to specify a record in which the "occurrence date and time" includes the same date as the defect occurrence date included in the application for the replacement request received from the component warehouse system 300. Then, the application management system 500 reads the "content of measures proposed by the system" and the "recovery measures" stored in association with the "occurrence date and time" of the specified record and determines whether or not the device or apparatus to be replaced has been registered from the diagnosis result of the diagnostic system indicating that replacement is necessary and the mobile terminal 200 of the maintenance company (S906).

When the application management system 500 determines that the above-mentioned content has not been registered in the "content of measures proposed by the system" and the "recovery measures" (S906; NO), it registers the defect occurrence date 3011, the product number 3012, and the replacement device name 3013 included in the replacement request information applied for in S901 as a new record of the database 501 together with the "application date", which is the date on which the replacement request was applied for, and the "maintenance company" and records "rejected" in the "status" (S907). Furthermore, the application management system 500 notifies the component warehouse system 300 that the device applied for in S901 has not been replaced by the maintenance worker and displays a device non-replacement screen that prompts the user to re-enter each information item in the application for the replacement request since the information has not been registered in the database 401 of the information processing device 400 (S908).

On the other hand, when the application management system 500 determines that the above-mentioned content has been registered in the "content of measures proposed by the system" and the "recovery measures" (S906; YES), it registers the defect occurrence date 3011, the product number 3012, and the replacement device name 3013 included in the replacement request information applied for in S901 as a new record of the database 501 together with the "application date", which is the date on which the replacement request was applied for, and the "maintenance company". In addition, the application management system 500 reads the "occurrence date and time", the "product number", the "recovery measures", and the "content of measures proposed by the system" in the record of the database 401 determined in S906, writes them to the items "defect occurrence date", "product number", "replacement device name", and "replacement device recommended by the system" in the registered record, respectively, and registers the items as a new application for a replacement request (S909).

In addition, the application management system 500 specifies a record including the same maintenance company and product number as the maintenance company and the product number registered in S909 from the database 601 of the delivered apparatus management system 600 and determines whether or not the device with the product number is within the warranty period (S910). When the application management system 500 determines that the device with the product number is within the warranty period (S910; YES), the application management system 500 reads the "warranty period" from the delivered apparatus management system 600, records the warranty period in the "warranty period" of the database 501, and proceeds to S913. In S910, when the "defect occurrence date" is included in the warranty period, it is determined that the device with the product number is within the warranty period.

On the other hand, when the application management system 500 determines that the device with the product number is not within the warranty period (S910; NO), it records "rejected" in the "status" of the record registered in S909 (S911). In addition, the application management system 500 notifies the component warehouse system 300 that the device applied for in S901 is out of the warranty period and displays an out-of-warranty-period screen prompting the user to re-enter each information item in the application for the replacement request (S912). At this time, the component warehouse system 300 may display a message for checking whether or not there are any input errors on the screen in the application for the replacement request. Specifically, a message for checking whether or not there are any errors in the input of the "defect occurrence date", the "product number", and the "replacement device name" on the screen 301 shown in FIG. 4 may be output to the screen to prompt the user to re-enter the information. In this case, the process returns to S901, and the subsequent processes are repeated as in S904, S905, and S908. The message for checking whether or not there are any errors may be output in S904, S905, and S908.

On the other hand, when the application management system 500 determines that the device with the product number is within the warranty period (S910; YES), it further determines whether or not the "replacement device name" of the record registered in S909 is the same device as the device diagnosed for a similar defect that occurred in the past (S913).

When the application management system 500 determines that the "replacement device name" of the record registered in S909 is not the same device as the device diagnosed for a similar defect that occurred in the past (S913; NO), it accesses the database 501 and registers "pending" in the "status" of the record for the product number (S914).

Furthermore, the application management system 500 determines whether or not the measures (for example, replacement) for the device with the product number, for which "pending" has been registered, have been appropriate (S915). The determination of whether or not the measures (for example, replacement) have been appropriate may be performed by determination of validity by the following three methods.

First, a first method will be described. For example, the application management system 500 searches the database 501 for a product number similar to the product number included in the application for the replacement request received in S902 and outputs the search result to the display device of the application management system 500. When product numbers are predetermined for devices having the same type of function in the same system, the similar product numbers mean, for example, these product numbers. In a case where, while the device with the product number "7512345" is a banknote deposit and withdrawal unit and the banknote deposit and withdrawal unit has one banknote rejection box and three recycling boxes, the device with the product number "7512346" is also a banknote deposit and withdrawal unit and the banknote deposit and withdrawal unit has one banknote rejection box and four recycling boxes, both the devices have the same functions except that they have different numbers of recycling boxes. Therefore, in this case, both the devices are determined to have similar product numbers (that is, to be devices having the same type of function). In addition, when the status of the device with the similar product number is "approved", the application management system 500 determines that the current replacement of the device, for which the application for the replacement request has been made (that is, the device in which a defect, such as a malfunction, a breakdown, or a failure, has occurred) is valid because the measures are the same as those for the device with the similar product number. Then, when the determination is valid (S915; YES), the process proceeds to S918.

On the other hand, when the product numbers are not predetermined for the devices having the same type of function in the same system, the application management system 500 determines that both the devices are not similar to each other and that the replacement of the device or apparatus, for which the application for the replacement request has been made, is not valid (S915; NO). For example, in a case where, while the device with the product number "7512345" is a banknote deposit and withdrawal unit and the banknote deposit and withdrawal unit has one banknote rejection box and three recycling boxes, the device with the product number "6401234" is a banknote deposit and withdrawal unit and the banknote deposit and withdrawal unit does not have a banknote rejection box and has five recycling boxes, both the devices are determined not to have similar product numbers (that is, not to have the same type of function) because the product number systems are different and the devices do not have the same type of function of a "rejection box". As a result, it is determined that the current replacement of the device, for which the application for the replacement request has been made, is not valid because the replacement is measures for the device with the product number that is not similar. Then, when the determination is not valid (S915; NO), the application management system 500 records "rejected" in the status of the database 501 (S916) and notifies the component warehouse system 300 of the fact, and the component warehouse system 300 displays an invalid replacement screen, which indicates that the replacement of the device applied for in S901 is invalid and prompts the user to re-enter each information item in the application for the replacement request, on the display device of the computer (S917).

Next, a second method will be described. For example, the application management system 500 searches the database 401 of the information processing device 400 for the "product number" and the "occurrence date and time" including the same values as the "product number" and the "defect occurrence date" included in the application for the replacement request received in S902 and outputs, to the display device of the application management system 500, the "error code" and the "device status when the error occurred" stored in association with the "occurrence date and time" and the "product number" and a message prompting the person in charge at the manufacturer to check the information.

Then, the person in charge at the manufacturer determines whether or not a relationship between the "error code" and the "device state when the error occurred", and the replaced device stored in the "recovery measures" stored in association with the "error code" and the "device state when the error occurred" is appropriate. When the person in charge determines that the replaced device is not appropriate, the person in charge inputs information indicating the fact on the screen displayed on the display device of the application management system 500 (S915; NO). When receiving the input, the application management system 500 records "rejected" in the status of the database 501 (S916) and notifies the component warehouse system 300 of the fact. The component warehouse system 300 displays a screen, which indicates that the replacement of the device applied for in S901 is invalid and prompts the user to re-enter each information item in the application for the replacement request, on the display device of the computer (S917).

On the other hand, when the person in charge at the manufacturer determines that the relationship between the "error code" and the "device state when the error occurred", and the replaced device stored in the "recovery measures" stored in association with the "error code" and the "device state when the error occurred" is appropriate and inputs information indicating the fact (S915; YES), the process proceeds to S918.

Next, a third method will be described. For example, the application management system 500 reads, from the database 501, the "maintenance company" registered in association with the "product number" and the "defect occurrence date" included in the application for the replacement request received in S902 and outputs contact information (an email address and a telephone number) of the read maintenance company to the display device of the application management system 500. At this time, the application management system 500 outputs, to the display device, a message that prompts the person in charge at the manufacturer to directly contact the maintenance company and to check the state of the device at the time of the occurrence of an error and the error code, the error code, and the state of the device or the apparatus at the time of the occurrence of the error.

The person in charge at the manufacturer contacts the above-described contact information to directly contact the maintenance worker of the maintenance company and to hear about the information displayed on the display device from the maintenance worker. When it is determined from the results of the hearing that the replacement of the device is not appropriate, the person in charge inputs information indicating the fact on the screen of the application management system 500 (S915; NO). When receiving the input, the application management system 500 records "rejected" in the status of the database 501 (S916) and notifies the component warehouse system 300 of the fact, and the component warehouse system 300 displays a screen, which indicates that the replacement of the device applied for in S901 is not valid and prompts the user to re-enter each information item in the application for the replacement request, on the display device of the computer (S917).

On the other hand, when the person in charge at the manufacturer determines from the results of the hearing that the replacement of the device is appropriate and inputs information indicating the fact (S915; YES), the process proceeds to S918. The determination method in S915 has been described above using three examples. Next, the processes in S918 and the subsequent steps will be described.

The application management system 500 records "approved" in the "status" stored in association with the "product number" determined to be appropriate in S915. In addition, the application management system 500 copies the value of the "replacement device name" and records the value in the "provided replacement device name" stored in association with the "status" recorded as "approved" (S918).

Then, the application management system 500 transmits the "provided replacement device name" recorded in S918, and the "product number" and the "maintenance company name" corresponding to the "provided replacement device name" as order information to the manufacturer-side component warehouse system 700. At this time, the application management system 500 records "transmitted" in the "replacement device order information status" stored in association with the product number (S919).

When receiving the order information from the application management system 500 (S920), the manufacturer-side component warehouse system 700 performs a process of delivering a device having the same product number as the product number included in the order information as the replacement from the warehouse managed by the manufacturer-side component warehouse system 700 (S921). In addition, the manufacturer-side component warehouse system 700 performs a process of searching the database 601 for the "product number" and a "replacement shipping destination" that corresponds to the same "product number" and "maintenance company name" as the above-described "product number" and "maintenance company name" and shipping the replacement delivered in S921 to the "replacement shipping destination" as the actual replacement shipping destination (S922).

The manufacturer-side component warehouse system 700 writes the shipping date, shipping destination, and shipping slip number of the replacement shipped in S922 as the shipping completion information in the "replacement shipping date", the "replacement shipping destination", and the "shipping slip number" of the database 501 of the application management system 500 (S923), respectively. Then, the component warehouse system 300 performs a process of receiving the replacement shipped from the manufacturer-side component warehouse system 700, and the administrator of the component warehouse system 300 receives the replacement and stores the replacement as the replenishment stock of the device, for which the application for the replacement request has been made, in the component warehouse (S924).

Figure 10:
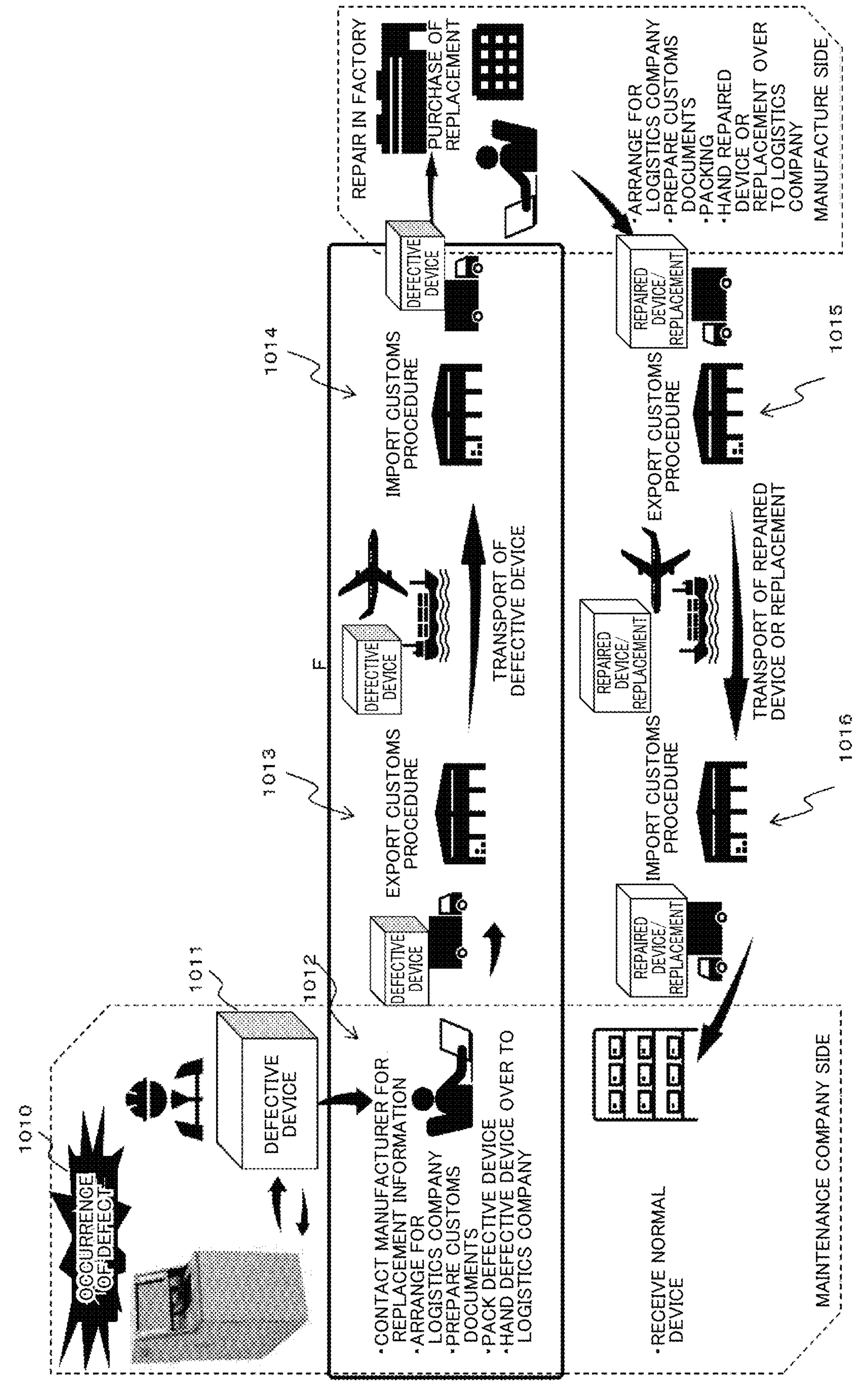
FIG. 10 is a view showing an example of an in-warranty (IW) compensation service according to the related art.

The embodiment of the system has been described above with reference to the drawings. In the related art, as shown in FIG. 10, when a defect, such as a malfunction, a breakdown, or a failure, occurs in a device of an ATM 1010 and a replacement for the defective device 1011 is requested 1012, a procedure is performed in the order of (1) a process of contacting the manufacturer to request the replacement, (2) a process of arranging for a logistics company, (3) a process of preparing customs documents, (4) a process of packing the defective device, and (5) a process of handing the defective device over to the logistics company. In addition, it is necessary to ship the replacement via an export customs procedure 1013 and an import customs procedure 1014 and then to hand the replacement over to the manufacturer. Then, the manufacturer needs to repair the received device or to make preparations to provide the replacement. Specifically, a procedure is performed in the order of (6) a process of arranging for a logistics company, (7) a process of preparing customs documents, (8) a process of packing the repaired device or the replacement, and (9) a process of handing the repaired device or the replacement over to the logistics company. In addition, it is necessary to ship the repaired device or the replacement via an export customs procedure 1015 and an import customs procedure 1016 and then to hand the repaired device or the replacement over to the maintenance company.

Therefore, the problems with the related art are that the burden on the maintenance company (transportation costs and export procedures) is large and the lead time until the maintenance company receives a good product is long. In addition, the manufacturer takes the trouble to receive the defective device, to repair the device or to arrange for a replacement, and then to ship the replacement. As a result, collecting the defective device is a heavy burden on not only the maintenance company but also the manufacturer. Further, the repaired device is treated as a used item, depending on the country in which the maintenance company maintains the ATM, and may be restricted not to be imported. In this case, the problem is that the repaired device is not capable of being returned to the maintenance site or factory where the maintenance company maintains the device.

Figure 11:
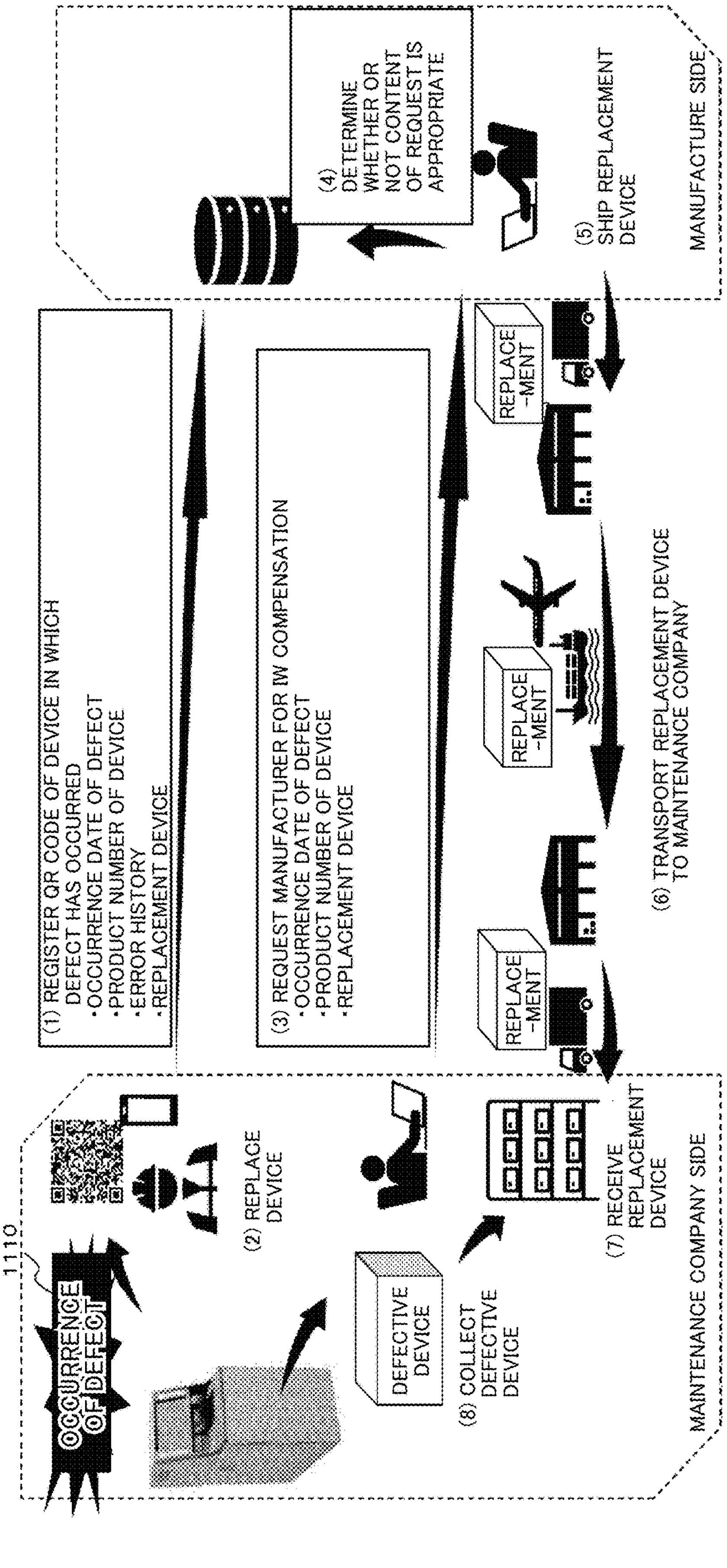
FIG. 11 is a view showing an example of an in-warranty (IW) compensation service according to this embodiment.

However, according to this system, as shown in FIG. 11, (1) a QR code (registered trademark) is registered as the two-dimensional code of the device in which a defect has occurred 1110, (2) the device in which the defect has occurred is replaced, and (3) the maintenance company requests the manufacturer for an in-warranty (IW) compensation. Then, (4) the manufacturer determines whether or not the content of the request is appropriate, (5) ships a replacement device, and (6) transports the replacement device to the maintenance company. Further, (7) the maintenance company can receive the replacement device and (8) collect the defective device. Therefore, in particular, since it is not necessary to transfer the device in which the defect has been occurred between the maintenance company and the manufacturer, it is possible to provide a replacement without going through a complicated procedure. In addition, it is not necessary to transfer the repaired item, which significantly reduces the amount of work required for the maintenance company to return the device in which the defect has occurred. Furthermore, the information of the two-dimensional barcode can be used as evidence that the device is broken down.

As described above, the maintenance system according to this embodiment makes it possible to continuously provide services while reducing the burden of collecting the object to be maintained such as the device or apparatus in which a defect has occurred. For example, as described using S902, S906, S909, S913, and S918 in FIGS. 1, 8, and 9 and the like, in a maintenance system (for example, the maintenance system 1000) for maintaining an object to be maintained (for example, an ATM or a device of the ATM) between a maintenance company and a manufacturer using a computer having a processor and a memory, the maintenance company has a first computer (for example, the mobile terminal 200) and a second computer (for example, the computer of the component warehouse system 300) managed by the maintenance company, and the manufacturer has a third computer (for example, the information processing device 400 and the computer of the application management system 500) managed by the manufacturer. A processor of the first computer receives operation information for a defect of the object to be maintained outputted from the object to be maintained and transmits the received operation information to the third computer of the manufacturer. A processor of the third computer stores the operation information in the memory. The second computer transmits replacement request information (for example, the information inputted from the replacement request screen 301 shown in FIG. 4) for requesting a replacement for the object to be maintained to the third computer of the manufacturer based on a request (for example, S4 shown in FIG. 1) received from the first computer. The processor of the third computer approves an application for the replacement for the object to be maintained, in which the defect has occurred, when the operation information stored in the memory is matched with the replacement request information received from the second computer.

Therefore, as described using FIGS. 10 and 11, while reducing the burden of collecting the object to be maintained (for example, the ATM or the device included in the ATM), such as a device or an apparatus in which a defect has occurred, it is possible to rapidly recover the object to be maintained and to continuously provide services to bank employees working at a branch where the ATM is installed and customers who use the branch.

In addition, as described using S913 to S915 in FIG. 9 and the like, the processor of the third computer reads operation information including the same defect as the operation information received from the first computer from past operation information (for example, the learning data 402 shown in FIG. 5) stored in the memory, withholds a response to the application when the replacement request information does not include the same recovery measures as recovery measures (for example, the replacement of the device proposed by the diagnostic system) for the defect included in the read past operation information, and performs a validity determination process of determining whether or not the recovery measures included in the replacement request information are valid. Therefore, the application is not approved unless the recovery measures are proven and reliable, which makes it possible to prevent unnecessary shipment of replacements.

Further, as described using S915 in FIG. 9 and the like, in the validity determination process, when recovery measures included in past replacement request information similar to the replacement request information to a certain extent (for example, the past product number similar to the product number included in the application for the replacement request) have been approved, the processor of the third computer determines that the recovery measures included in the replacement request information received from the second computer are valid and changes the response from a pending state to an approved state. Therefore, even for the application for the replacement request determined to be temporarily pending, it is possible to rapidly ship a replacement satisfying the same function as that before the occurrence of the defect.

Furthermore, as described using S915 in FIG. 9 and the like, in the validity determination process, the processor of the third computer outputs information (for example, a message for prompting the user to check the "error code" and the "device state when the error occurred" stored in association with the "occurrence date and time" and the "product number") for prompting a user to check the defect for the object to be maintained, for which the recovery measures included in the replacement request information received from the second computer have been performed, to a display device of the third computer, determines that the recovery measures included in the replacement request information received from the second computer are appropriate when a person in charge at the manufacturer inputs information indicating that the recovery measures are appropriate in response to the information for prompting the user to check the defect which has been output to the display device, and changes the response from a pending state to an approved state. Therefore, even for the application for the replacement request determined to be temporarily pending, it is possible to rapidly ship a replacement for the object to be maintained in which the defect, which has been rechecked by the person in charge at the manufacturer and determined to be valid, has occurred.

Moreover, as described using S915 in FIG. 9 and the like, in the validity determination process, the processor of the third computer reads a maintenance company of the object to be maintained, for which the recovery measures included in the replacement request information received from the second computer have been performed, from a database (for example, the application management information 502 shown in FIG. 6) in which the object to be maintained and the maintenance company have been registered in advance in association with each other, outputs the maintenance company to a display device of the third computer, determines that the recovery measures included in the replacement request information received from the second computer are valid when a person in charge at the manufacturer inputs information indicating that the recovery measures are appropriate based on a result of contacting and hearing from the maintenance company output to the display device, and changes the response from a pending state to an approved state.

Therefore, for the application for the replacement request determined to be temporarily pending, it is possible to rapidly ship a replacement through reliable situation determination based on the results of the person in charge at the manufacturer directly contacting the maintenance worker of the maintenance company and hearing about the defect. In addition, the person in charge at the manufacturer can obtain determination information for understanding the skills of the maintenance worker of the maintenance company.

In addition, as described using FIG. 1 and the like, the first computer is a mobile terminal (for example, a smartphone or a tablet terminal) that has a camera and is operated by a maintenance worker who maintains the object to be maintained. The camera captures a two-dimensional barcode, into which the object to be maintained has converted the operation information and which has been displayed on a display device of the object to be maintained, in response to an operation by the maintenance worker. The processor of the first computer transmits the two-dimensional barcode captured by the camera as the operation information to the third computer of the manufacturer (performs the processes in S801 to S804 in FIG. 8 and the like). Therefore, it possible to reliably and quickly diagnose a defect with high accuracy and to perform rapid recovery measures for the ATM, as compared to a case where the maintenance worker reads the operation information and investigates the defect.

Further, the maintenance system maintains an ATM or/and a device of the ATM as the object to be maintained. The processor of the first computer receives the operation information for a defect of the ATM or/and the device of the ATM and transmits the operation information to the third computer of the manufacturer. A processor of the second computer transmits the replacement request information for the ATM or/and the device of the ATM to the third computer based on the request received from the first computer. The processor of the third computer approves an application for a replacement for the ATM or/and the device of the ATM in which the defect has occurred when the operation information of the ATM or/and the device of the ATM stored in the memory is matched with the replacement request information of the ATM or/and the device of the ATM received from the second computer. Therefore, it is possible to reduce the burden of collecting the ATM or various devices constituting the ATM and to continuously provide services (for example, banknote deposit and withdrawal services) through rapid recovery.

The present invention has been described in detail above with reference to the drawings. However, the present invention is not limited to the above-mentioned various examples, and various modifications can be made without departing from the gist of the present invention.

REFERENCE SIGNS LIST

1000: Maintenance system
1001: Diagnostic system
1002: Replacement request system
100: ATM
200: Mobile terminal
300: Component warehouse system
400: Information processing device
401: Database
500: Application management system
501: Database

600: Delivered apparatus management system

601: Database

700: Manufacturer-side component warehouse system

What is claimed is:

1. A maintenance system for maintaining an object to be maintained between a maintenance company and a manufacturer, the maintenance system comprising:

a first computer and a second computer associated with the maintenance company, wherein the first computer is a mobile terminal that includes a camera, and a third computer associated with the manufacturer and able to communicate with the first computer and the second computer over a network, wherein:

a processor of the first computer is configured to receive, via the camera, operation information for a defect of the object to be maintained, which has been converted by a processor of the object to be maintained into a two-dimensional barcode and displayed on a display of the object, the two-dimensional barcode encoded with information identifying the object, an error code identifying a defect, and a state of the object when the error code is output, and, wherein the processor of the first computer is configured to transmit the two-dimensional barcode captured by the camera as the operation information to the third computer of the manufacturer, a processor of the third computer is configured to store the operation information in a memory associated with the third computer, a processor of the second computer is configured to transmit replacement request information for requesting a replacement for the object to be maintained to the third computer of the manufacturer based on a request received from the first computer, and the processor of the third computer is configured to approve an application for the replacement for the object to be maintained, in which the defect has occurred, when the operation information stored in the memory associated with the third computer is matched with the replacement request information received from the second computer.

2. The maintenance system according to claim 1, wherein the processor of the third computer reads operation information including a same defect as the operation information received from the first computer from past operation information stored in the memory, withholds a response to the application when the replacement request information does not include same recovery measures as recovery measures for the defect included in the past operation information, and performs a validity determination process of determining whether the recovery measures included in the replacement request information are valid.

3. The maintenance system according to claim 2, wherein, in the validity determination process, when recovery measures included in past replacement request information similar to the replacement request information to a certain extent have been approved, the processor of the third computer determines that the recovery measures included in the replacement request information received from the second computer are valid and changes the response from a pending state to an approved state.

4. The maintenance system according to claim 2, wherein in the validity determination process, the processor of the third computer outputs information for prompting a user to check the defect for the object to be maintained, for which the recovery measures included in the replacement request information received from the second computer have been performed, to a display device of the third computer, determines that the recovery measures included in the replacement request information received from the second computer are appropriate when a person in charge at the manufacturer inputs information indicating that the recovery measures are appropriate in response to the information for prompting the user to check the defect which has been output to the display device, and changes the response from a pending state to an approved state.

5. The maintenance system according to claim 2, wherein, in the validity determination process, the processor of the third computer determines the maintenance company of the object to be maintained, for which the recovery measures included in the replacement request information received from the second computer have been performed, from a database in which the object to be maintained and the maintenance company have been registered in advance in association with each other, outputs the maintenance company to a display device of the third computer, determines that the recovery measures included in the replacement request information received from the second computer are valid when a person in charge at the manufacturer inputs information indicating that the recovery measures are appropriate based on a result of contacting and hearing from the maintenance company output to the display device, and changes the response from a pending state to an approved state.

6. The maintenance system according to claim 1, wherein the maintenance system maintains at least one of an automated teller machine (ATM) or a device of the ATM as the object to be maintained, the processor of the first computer receives the operation information for a defect of the ATM or the device of the ATM and transmits the operation information to the third computer of the manufacturer, a processor of the second computer transmits the replacement request information for the ATM or the device of the ATM to the third computer based on the request received from the first computer, and the processor of the third computer approves an application for a replacement for the ATM or the device of the ATM in which the defect has occurred when the operation information of the ATM or the device of the ATM stored in the memory is matched with the replacement request information of the ATM or the device of the ATM received from the second computer.

7. A maintenance method for maintaining an object to be maintained using a first computer and a second computer associated with a maintenance company and a third computer associated with a manufacturer, the maintenance method comprising:

causing the first computer to receive, via a camera associated with the first computer, operation information for a defect of the object to be maintained, which has been converted by a processor of the object to be maintained into a two-dimensional barcode and displayed on a display of the object, the two-dimensional barcode encoded with information identifying the object, an error code identifying a defect, and a state of the object when the error code is output, and, wherein the first computer transmits the two-dimensional barcode captured by the camera as the operation information to the third computer of the manufacturer;

causing the third computer to store the operation information in a memory associated with the third computer;

causing the second computer to transmit replacement request information for requesting a replacement for the object to be maintained to the third computer of the manufacturer based on a request received from the first computer; and causing the third computer to approve an application for the replacement for the object to be maintained, in which the defect has occurred, when the operation information stored in the memory associated with the third computer is matched with the replacement request information received from the second computer.

* * * * *